US012165789B2

(12) United States Patent
Bae et al.

(10) Patent No.: US 12,165,789 B2
(45) Date of Patent: Dec. 10, 2024

(54) FLEXIBLE FLAT CABLE AND MANUFACTURING METHOD THEREFOR

(71) Applicant: SAMSUNG ELECTRONICS CO., LTD., Suwon-si (KR)

(72) Inventors: Bumhee Bae, Suwon-si (KR); Jinjoo Kim, Suwon-si (KR); Jongwan Shim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/860,105

(22) Filed: Jul. 8, 2022

(65) Prior Publication Data

US 2022/0344073 A1    Oct. 27, 2022

Related U.S. Application Data

(63) Continuation of application No. PCT/KR2021/000237, filed on Jan. 8, 2021.

(30) Foreign Application Priority Data

Jan. 8, 2020    (KR) .................. 10-2020-0002389

(51) Int. Cl.
*H01B 7/08*    (2006.01)
*G02B 6/42*    (2006.01)
(Continued)

(52) U.S. Cl.
CPC ............ *H01B 7/04* (2013.01); *G02B 6/4204* (2013.01); *H01B 7/08* (2013.01); *H01B 11/002* (2013.01); *H01B 13/008* (2013.01)

(58) Field of Classification Search
CPC ......... H01B 7/08; H01B 11/22; G02B 6/3817
See application file for complete search history.

(56) References Cited

U.S. PATENT DOCUMENTS 5,756,280 A    5/1998   Soora et al.
7,399,929 B2   7/2008   Ueno et al.
(Continued)

FOREIGN PATENT DOCUMENTS

JP    2005-093178    *    4/2005
JP    2012-168442 A        9/2012
(Continued)

OTHER PUBLICATIONS

International Search Report mailed Apr. 26, 2021 for PCT/KR2021/000237.
(Continued)

*Primary Examiner* — Chau N Nguyen
(74) *Attorney, Agent, or Firm* — CANTOR COLBURN LLP

(57) ABSTRACT

A flexible flat cable includes a highly reflective member having a plate shape, light-transmitting signal transmission members spaced apart from each other on a first surface of the highly reflective member, conductive signal transmission members spaced apart from each other on the first surface of the highly reflective member, a highly reflective adhesive member that fixes the light-transmitting signal transmission members and the conductive signal transmission members to the highly reflective member, and couples the highly reflective member to a non-conductive member, the non-conductive member including a first surface in contact with the highly reflective adhesive member, and a second surface opposite to the first surface of the non-conductive member, an adhesive member that is disposed on the second surface of the non-conductive member, and couples an electrical shield member to the non-conductive member, and the electrical shield member coupled to the non-conductive member by the adhesive member.

10 Claims, 8 Drawing Sheets

(51) Int. Cl.
H01B 7/04 (2006.01)
H01B 11/00 (2006.01)
H01B 11/22 (2006.01)
H01B 13/008 (2006.01)

(56) References Cited

U.S. PATENT DOCUMENTS

| | | | |
|---|---|---|---|
| 8,338,709 B2 * | 12/2012 | Kodama | H01B 7/0838 174/117 FF |
| 8,666,471 B2 | 3/2014 | Rogers et al. | |
| 8,792,760 B2 | 7/2014 | Choi et al. | |
| 8,934,746 B2 | 1/2015 | Yu et al. | |
| 9,936,574 B2 | 4/2018 | Rogers et al. | |
| 9,986,924 B2 | 6/2018 | Rogers et al. | |
| 10,651,526 B2 | 5/2020 | Bae et al. | |
| 11,057,991 B2 | 7/2021 | Rogers et al. | |
| 2004/0005109 A1 | 1/2004 | Tsushima et al. | |
| 2005/0106368 A1 | 5/2005 | Ha et al. | |
| 2007/0115682 A1 * | 5/2007 | Roberts | H01R 12/721 362/555 |
| 2007/0193770 A1 | 8/2007 | Ueno et al. | |
| 2007/0196067 A1 | 8/2007 | Lee et al. | |
| 2009/0126972 A1 * | 5/2009 | Matsushita | H01B 7/0861 174/113 R |
| 2012/0165759 A1 | 6/2012 | Rogers et al. | |
| 2012/0207438 A1 | 8/2012 | Yu et al. | |
| 2018/0053981 A1 | 2/2018 | Bae et al. | |
| 2018/0061530 A1 * | 3/2018 | Lee | H01B 3/441 |
| 2018/0375591 A1 * | 12/2018 | Sipes, Jr. | H04L 12/10 |
| 2019/0033544 A1 * | 1/2019 | Sasaki | G02B 6/4416 |
| 2019/0341172 A1 * | 11/2019 | Nishio | G02B 6/3885 |
| 2020/0315488 A1 | 10/2020 | Rogers et al. | |

FOREIGN PATENT DOCUMENTS

| | | |
|---|---|---|
| KR | 10-0207885 B1 | 7/1999 |
| KR | 20030094509 A | 12/2003 |
| KR | 20050046356 A | 5/2005 |
| KR | 10-2007-0038025 A | 4/2007 |
| KR | 20070083376 A | 8/2007 |
| KR | 10-1261320 B1 | 5/2013 |
| KR | 10-2014-0095881 A | 8/2014 |
| KR | 10-2018-0019472 A | 2/2018 |
| KR | 10-2018-0089211 A | 8/2018 |
| KR | 10-2019-0072915 A | 6/2019 |

OTHER PUBLICATIONS

Korean Office Action for KR Application No. 10-2020-0002389 mailed on Jul. 8, 2024.

* cited by examiner

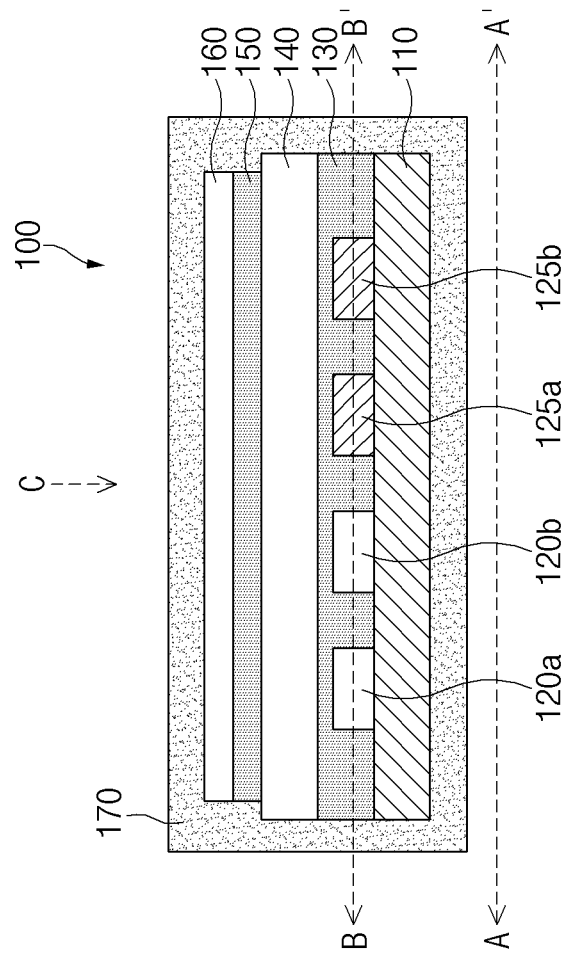
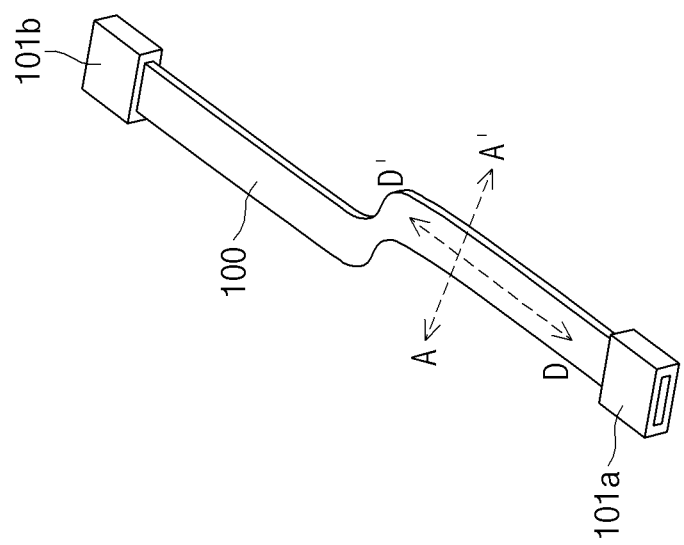
FIG. 1B
FIG. 1A

FLEXIBLE FLAT CABLE AND MANUFACTURING METHOD THEREFOR

TECHNICAL FIELD

Various embodiments described in the disclosure relate to a flexible flat cable and a method for manufacturing the same.

BACKGROUND ART

As sizes and thicknesses of electronic device are becoming smaller, spatial restrictions in interiors of the electronic device are being increased. Due to the spatial restrictions, a flexible flat cable having a relatively small thickness as compared with that of a coaxial cable is widely used. The flexible flat cable may have a small thickness, and due to flexibility thereof, may provide various mounting options in the electronic device. In general, the flexible flat cable may include conductive signal lines having electrical conductivity.

For rapid transmission of data and robust transmission of data, optical cables are widely used. The optical cables may minimize interferences by other electromagnetic signals because the optical cables use optical signals. The optical cable may generally include one or more optical fibers, and a plurality of members for protecting the optical fibers.

DISCLOSURE

Technical Problem

A flexible flat cable that transmits electrical signals by conductive signal lines may be vulnerable to transmission of signals at an ultra-high speed. The flexible flat cable may have a relatively low shielding performance as compared with a conventional coaxial cable, for example. Furthermore, due to impedances that are in the conductive signal lines, a high impedance may appear in the ultra-high speed signals. Accordingly, the flexible flat cable using the conductive signal lines may not be suitable for transmission of the ultra-high speed signals.

The optical cables may be advantageous in transmission of the ultra-high speed signals as compared with the conductive signal lines. However, the optical fibers used for the optical cables do not have a fixed shape, it may not be easy to manufacture them. To manufacture the optical cables, the optical fibers may be located in grooves after the grooves are defined, for example. In this case, a separate etching process for defining the groove may be desired. Alternatively, taping for surrounding the optical fibers may be used, for example. In this way, the method for manufacturing the optical cables is complex, and product costs may be increased due to the complexity.

Technical Solution

In an embodiment, a flexible flat cable includes a highly reflective member having a plate shape, a pair of light-transmitting signal transmission members disposed on a first surface of the highly reflective member and spaced apart from each other, a pair of conductive signal transmission members disposed on the first surface of the highly reflective member and spaced apart from each other, a highly reflective adhesive member fixing the pair of light-transmitting signal transmission members and the pair of conductive signal transmission members to the highly reflective member, and coupling the highly reflective member and a non-conductive member, the non-conductive member including a first surface contacting the highly reflective adhesive member, and a second surface facing an opposite direction to the first surface, an adhesive member disposed on the second surface of the non-conductive member, and an electrical shielding member coupled to the non-conductive member through the adhesive member.

In an embodiment, a method for manufacturing a flexible flat cable includes disposing a pair of light-transmitting signal transmission members and a pair of conductive signal transmission members on a first surface of a highly reflective member, fixing the pair of light-transmitting signal transmission members and the pair of conductive signal transmission members by a highly reflective adhesive member, and coupling the plate-shaped highly reflective member and a first surface of a non-conductive member, and coupling an electrical shielding member to a second surface of the non-conductive member which is opposite to the first surface of the non-conductive member.

Advantageous Effects

According to various embodiments of the disclosure, a hybrid flexible flat cable capable of transmitting optical signals and electrical signals may be provided.

The flexible flat cable according to various embodiments of the disclosure may be manufactured at low manufacturing costs.

In addition, the disclosure may provide various effects that are directly or indirectly recognized.

DESCRIPTION OF DRAWINGS

The above and other exemplary embodiments, advantages and features of this disclosure will become more apparent by describing in further detail exemplary embodiments thereof with reference to the accompanying drawings, in which:

FIG. 1A illustrates an embodiment of a flexible flat cable, and FIGS. 1B and 1C are cross-sectional views of the embodiment of the flexible flat cable of FIG. 1A.

With regard to description of drawings, the same or similar components may be marked by the same or similar reference numerals.

MODE FOR INVENTION

Figure 1C:
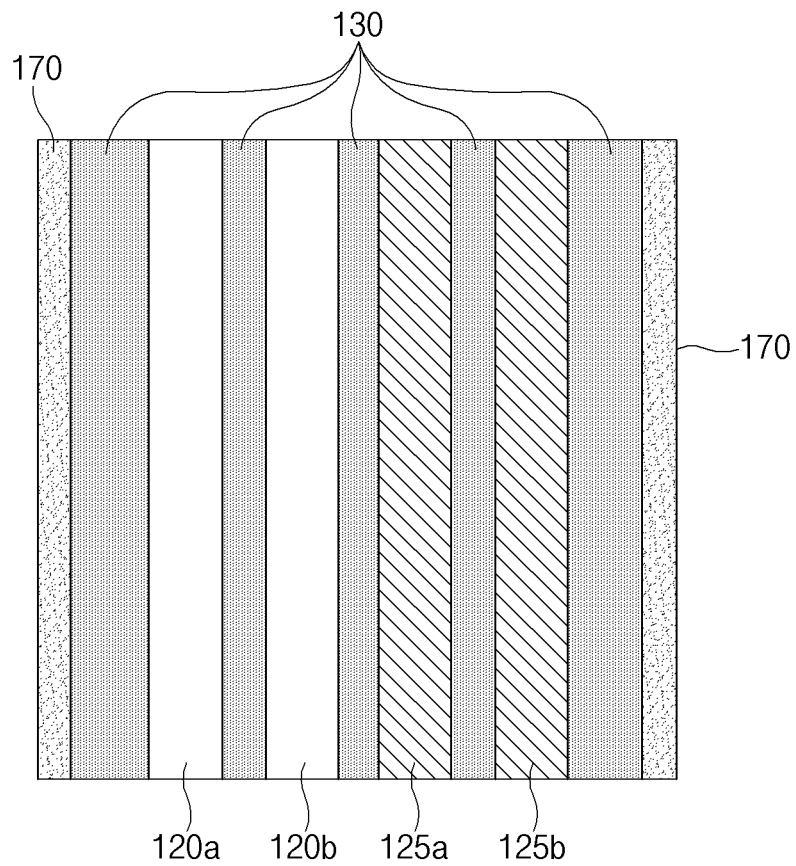

Hereinafter, various embodiments of the disclosure will be described with reference to the accompanying drawings. The embodiments and the terms used herein do not limit the technology described in the disclosure to specific forms, and should be construed to include various modifications, equivalents, and/or replacements of the embodiments.

With regard to description of drawings, similar components may be marked by similar reference numerals. Further, the terms, such as "first", "second", and the like used herein may refer to various elements of various embodiments of the disclosure, but do not limit the elements. Such terms are used only to distinguish an element from another element and do not limit the order and/or priority of the elements, for example. A first user device and a second user device may represent different user devices irrespective of sequence or importance, for example. Without departing the scope of the invention, a first element may be referred to as a second element, and similarly, a second element may be referred to as a first element, for example.

Terms used in this specification are used to describe specified embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. According to occasions, even a term defined in the disclosure cannot be construed to exclude the embodiments of the disclosure.

FIG. 1A illustrates an embodiment of a flexible flat cable 100, and FIG. 1B is a cross-sectional view of the embodiment of the flexible flat cable 100 of FIG. 1A taken along axis A-A'.

In an embodiment, the flexible flat cable 100 may be a hybrid flexible flat cable that may transmit optical signals and electric signals. In an embodiment, the flexible flat cable 100 may include at least one optical signal line for transmittance of optical signals, and at least one electric signal line for transmittance of electric signals, for example. The flexible flat cable 100 may include connectors 101a and 101b connected to opposite ends thereof. The embodiment of the connectors 101a and 101b illustrated in FIG. 1A is merely one of embodiments, and the invention is not limited thereto.

FIG. 1B corresponds to a cross-sectional view of the flexible flat cable 100, which is taken along axis A-A'. In an embodiment, the flexible flat cable 100 may include a highly reflective member 110, a pair of light-transmitting signal transmission member 120a and 120b, a pair of conductive signal transmission members 125a and 125b, a highly reflective adhesive member 130, a non-conductive member 140, an adhesive member 150, an electrical shielding member 160, and/or an outer sheath part 170. The embodiment of the connectors 101a and 101b illustrated in FIG. 1A is merely one of embodiments, and the invention is not limited thereto.

In an embodiment, the highly reflective member 110 may include a film type light reflecting dielectric, for example. The highly reflective member 110 may have a high light transmittivity and a low permittivity. Ideally, the highly reflective member 110 may have characteristics that are close to a total reflection (e.g., a light reflectivity of 100%). In an embodiment, the highly reflective member 110 may have a permittivity of about 3 or less, for example. In an embodiment, the highly reflective member 110 may include a material of a low permittivity that is close to 1. The highly reflective member 110 may provide shielding of electrical signals and optical signals due to the non-conductivity and the high light reflectivity. The highly reflective member 110 may include a polymer having flexibility.

In an embodiment, the pair of light-transmitting signal transmission members 120a and 120b may include a material that may transmit optical signals, for example. The light-transmitting signal transmission members 120a and 120b may be disposed on one surface of the highly reflective member 110. The light-transmitting signal transmission members 120a and 120b may be plate-shaped light-transmitting members. The light-transmitting signal transmission members 120a and 120b may have flexibility. The embodiment of the light-transmitting signal transmission members 120a and 120b illustrated in FIG. 1B is merely one of embodiments, and the invention is not limited thereto. The light-transmitting signal transmission members 120a and 120b may include an arbitrary material, such as a fiber or a transparent plastic film, which may transmit light. In an embodiment, the light-transmitting signal transmission members 120a and 120b may have a flat semicircular cut-away surface on one surface thereof, for example. In another embodiment, the light-transmitting signal transmission members 120a and 120b may have an elliptical cut-away surface. In another embodiment, the light-transmitting signal transmission members 120a and 120b may be optical fibers having a circular cut-away surface.

In an embodiment, the pair of conductive signal transmission members 125a and 125b may include a material that may transmit electrical signals, for example. The conductive signal transmission members 125a and 125b may be disposed on one surface of the highly reflective member 110. The conductive signal transmission members 125a and 125b may be plate-shaped conductive members. In an embodiment, the conductive signal transmission members 125a and 125b may have film shapes, for example. The embodiment of the conductive signal transmission members 125a and 125b illustrated in FIG. 1B is merely one of embodiments, and the invention is not limited thereto. The conductive signal transmission members 125a and 125b may have cross-sections having arbitrary shapes. The conductive signal transmission members 125a and 125b may include a metallic material (e.g., copper) having flexibility.

In an embodiment, the highly reflective adhesive member 130 may be an adhesive having a high light reflectivity. Ideally, the highly reflective adhesive member 130 may have characteristics that are close to a total reflection (e.g., a light reflectivity of 100%), for example. The highly reflective adhesive member 130 may include an adhesive having flexibility. The highly reflective adhesive member 130 may fix the light-transmitting signal transmission members 120a and 120b and the conductive signal transmission members 125a and 125b to the highly reflective member 110.

In an embodiment, the highly reflective adhesive member 130 may surround circumferences of the light-transmitting signal transmission members 120a and 120b, together with the highly reflective member 110, for example. The highly reflective adhesive member 130 may have a high reflectivity, and may allow transmission of optical signals through a total reflection through the light-transmitting signal transmission members 120a and 120b together with the highly reflective member 110. In an embodiment, the highly reflective adhesive member 130 may be an optically clear adhesive ("OCA")-based adhesive. The highly reflective adhesive member 130 may have flexibility and non-conductivity. The highly reflective adhesive member 130 may surround circumferences of the conductive signal transmission members 125a and 125b, together with the highly reflective member 110.

In an embodiment, the non-conductive member 140 may be a flexible film having a low permittivity, for example. The non-conductive member 140 may include a material having a dielectric constant of a predetermined value or less or a dissipation factor of a predetermined value or less. Due to the low permittivity of the non-conductive member 140, signal interferences with and/or signal losses of the conductive signal transmission members 125*a* and 125*b* may be reduced. A first surface of the non-conductive member 140 may be attached to one surface of the highly reflective member 110 by the highly reflective adhesive member 130.

In an embodiment, the adhesive member 150 may be a film type adhesive member, for example. The adhesive member 150 is a material having flexibility, and may attach the electrical shielding member 160 to a second surface (e.g., upper surface in FIG. 1B) of the non-conductive member 140. In an embodiment, the adhesive member 150 may be an epoxy-based adhesive, a polymer adhesive, or a polyurethane-based adhesive, for example. The adhesive member 150 may be a thermoplastic adhesive having a bonding property at a room temperature.

In an embodiment, the electrical shielding member 160 may provide impedance matching for the conductive signal transmission members 125*a* and 125*b*, for example. The electrical shielding member 160 may include a metallic material, and may be attached to the second surface of the non-conductive member 140 by the adhesive member 150. The first surface of the non-conductive member 140 may be a surface that faces the highly reflective member 110, and the second surface may be an opposite surface to the first surface. The electrical shielding member 160 may include a material having flexibility.

In an embodiment, the outer sheath part 170 may form an external appearance of the flexible flat cable 100, and may surround external appearances of the internal components of the flexible flat cable 100, for example. The outer sheath part 170 may be a flexible material having non-conductivity and a non-light transmitting property. The outer sheath part 170 may have an optical and/or electrical shielding property and/or an insulating property to physically protect the internal configurations of the cable 100.

FIG. 1C illustrates a cross-sectional view of the embodiment of the flexible flat cable 100 of FIG. 1A.

The cross-sectional view of FIG. 1C corresponds to a view obtained by cutting the flexible flat cable 100 in direction D-D' of FIG. 1A on surface B-B' of FIG. 1B and then viewing the flexible flat cable 100 in direction C of FIG. 1B. That is, FIG. 1C may be a top cross-sectional view of the embodiment of the flexible flat cable 100 of FIG. 1A.

As illustrated in FIG. 1C, the light-transmitting signal transmission members 120*a* and 120*b* may be spaced apart from each other by the highly reflective adhesive member 130. The conductive signal transmission members 125*a* and 125*b* may be spaced apart from each other by the highly reflective adhesive member 130. The light-transmitting signal transmission members 120*a* and 120*b* and the conductive signal transmission members 125*a* and 125*b* may be spaced apart from each other by the highly reflective adhesive member 130. In FIG. 1C, the light-transmitting signal transmission members 120*a* and 120*b* are disposed on the left side of the flexible flat cable 100, and the conductive signal transmission members 125*a* and 125*b* are disposed on the right side of the flexible flat cable 100. However, the embodiment of the light-transmitting signal transmission members 120*a* and 120*b* and the conductive signal transmission members 125*a* and 125*b* illustrated in FIG. 1C is merely one of embodiments, and the invention is not limited thereto.

Figure 2:
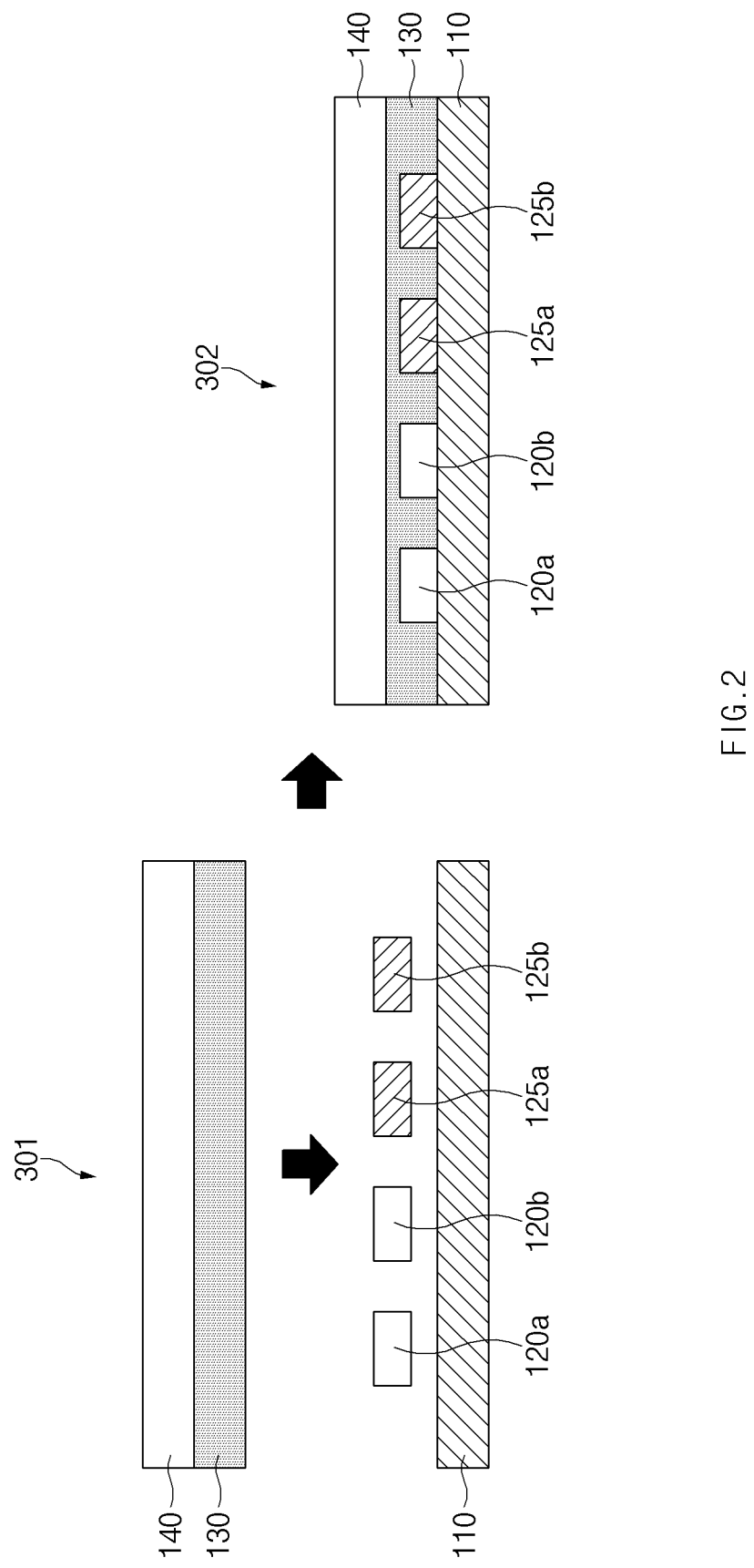
FIG. 2 illustrates an embodiment of a method for manufacturing a flexible flat cable.
Figure 3:
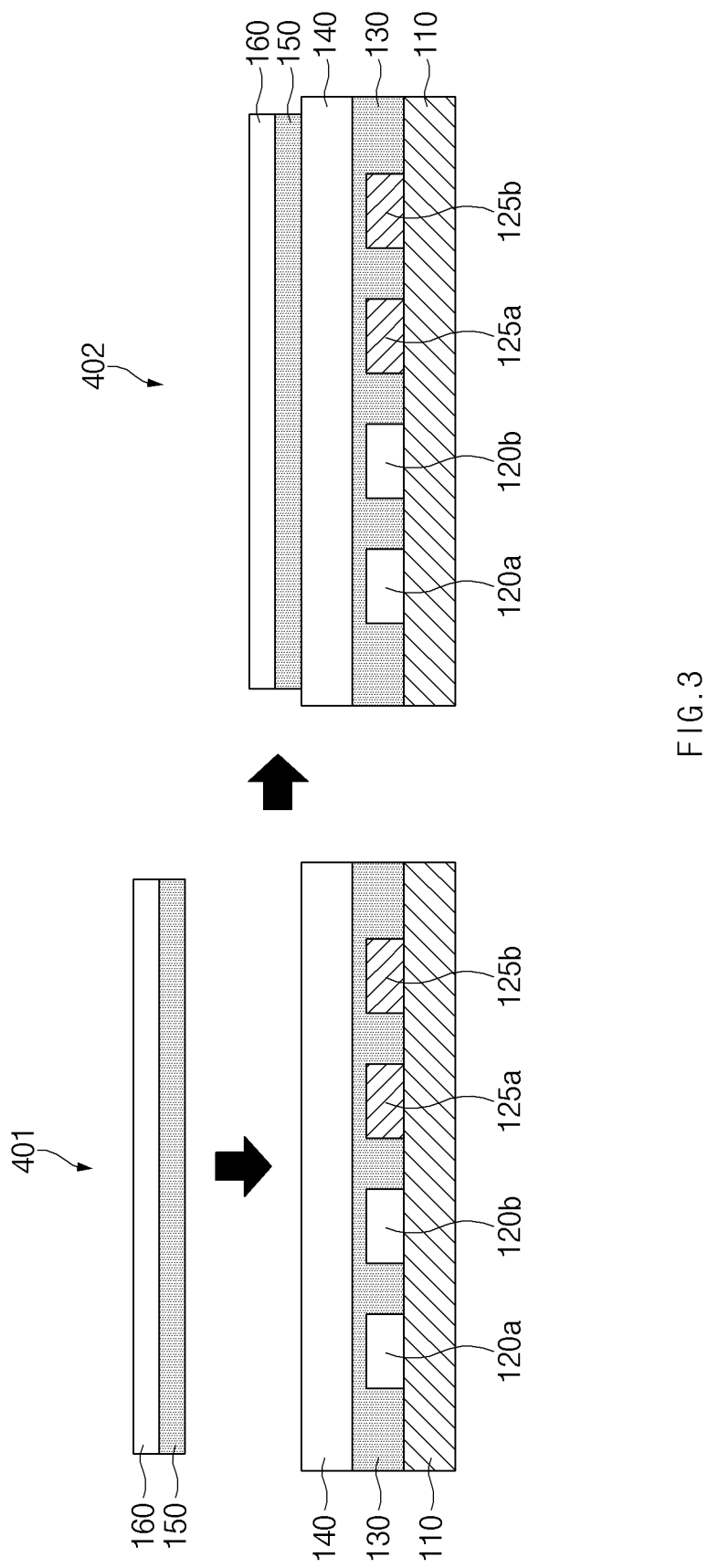
FIG. 3 illustrates an embodiment of a method for manufacturing a flexible flat cable.
Figure 4:
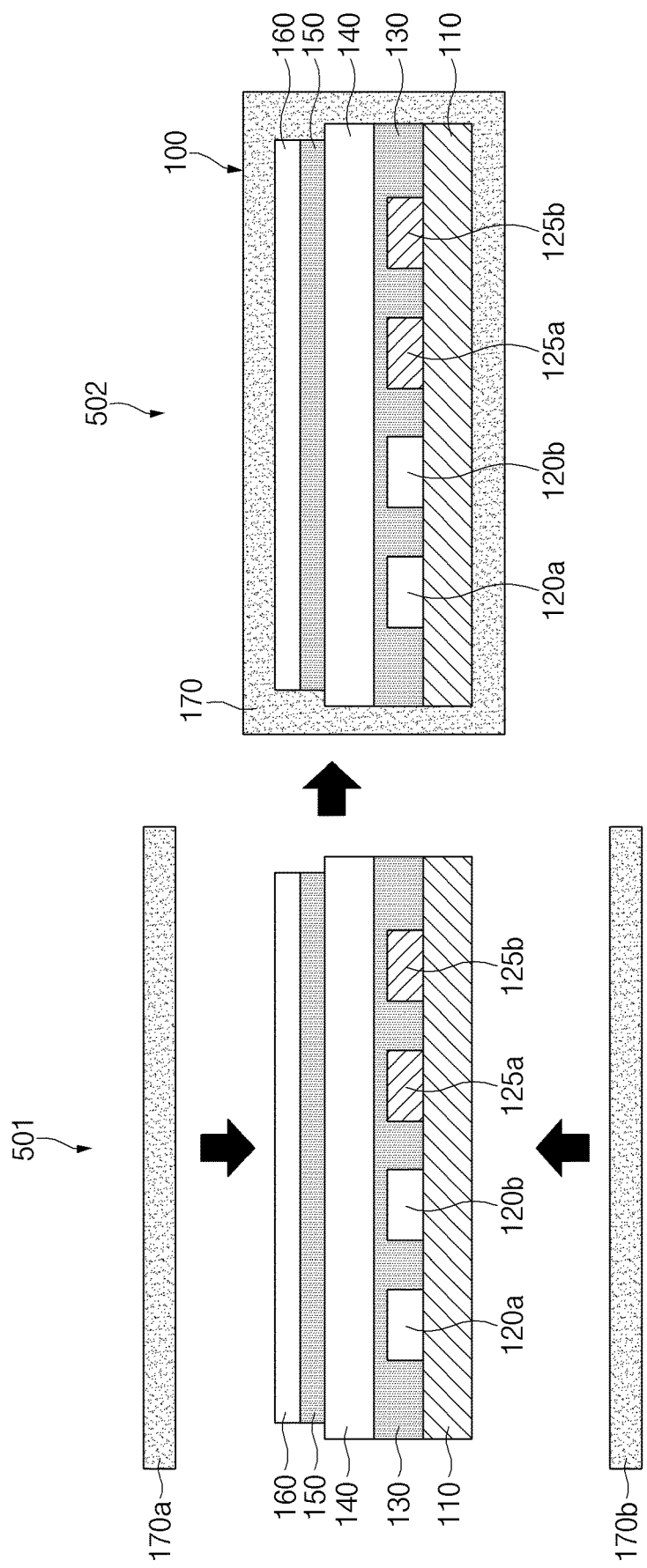
FIG. 4 illustrates an embodiment of a method for manufacturing a flexible flat cable.

FIGS. 2, 3, and 4 illustrate an embodiment of a method for manufacturing the flexible flat cable.

In an embodiment, the manufacturing method may include an operation of disposing the pair of light-transmitting signal transmission members 120*a* and 120*b* and the pair of conductive signal transmission members 125*a* and 125*b* on one surface of the highly reflective member 110. Referring to reference numeral 301 of FIG. 2, the light-transmitting signal transmission members 120*a* and 120*b* and the conductive signal transmission members 125*a* and 125*b* may be disposed on the one surface (e.g., upper surface in FIG. 2) of the highly reflective member 110. In an embodiment, the light-transmitting signal transmission member 120*a* and the light-transmitting signal transmission member 120*b* may be disposed on the one surface of the highly reflective member 110 to be spaced apart from each other by a predetermined interval, for example. The conductive signal transmission member 125*a* and the conductive signal transmission member 125*b* may be disposed on the one surface of the highly reflective member 110 to be spaced apart from each other by a predetermined interval. The light-transmitting signal transmission member 120*b* and the conductive signal transmission member 125*a* may be disposed on the one surface of the highly reflective member 110 to be spaced apart from each other by a predetermined interval. As will be described later, the method for disposing the light-transmitting signal transmission members and the conductive signal transmission members is not limited to the embodiment of FIG. 2.

In an embodiment, the manufacturing method may include an operation of fixing the pair of light-transmitting signal transmission members 120*a* and 120*b* and the pair of conductive signal transmission members 125*a* and 125*b* by the highly reflective adhesive member 130 on the highly reflective member 110, and coupling the plate-shaped highly reflective member and the first surface of the non-conductive member 140. After the process of disposing the light-transmitting signal transmission members 120*a* and 120*b* and the conductive signal transmission members 125*a* and 125*b* on the one surface of the highly reflective member 110, a bonding process using the highly reflective adhesive member 130 may be performed. In an embodiment, the bonding process may include attaching the non-conductive member 140 to the one surface of the highly reflective member 110 by the highly reflective adhesive member 130, by applying a predetermined pressure to the non-conductive member 140 at a predetermined temperature, for example. The bonding process may be referred to as a hot-press process.

As denoted by reference numeral 301, after the non-conductive member 140 is attached to the second surface (e.g., upper surface in FIG. 2) of the highly reflective adhesive member 130, the first surface of the highly reflective adhesive member 130 may be attached to the one surface of the highly reflective member 110. In another embodiment, after the first surface of the highly reflective adhesive member 130 is attached to the one surface of the highly reflective member 110, the non-conductive member 140 may be attached to the second surface of the highly reflective adhesive member 130. In this case, the hot press may be used for attachment of the non-conductive member 140.

Through the bonding process, as denoted by reference numeral 302, the non-conductive member 140 may be attached to the highly reflective member 110 by the highly reflective adhesive member 130. By pressing the non-conductive member 140 against the highly reflective member 110 in a predetermined temperature range, a shape of the highly reflective adhesive member 130 may be changed. In an embodiment, the highly reflective adhesive member 130 may fill a space between the non-conductive member 140 and the highly reflective member 110, for example. The highly reflective adhesive member 130 may fix the light-transmitting signal transmission members 120a and 120b and the conductive signal transmission members 125a and 125b onto the highly reflective member 110.

Although FIG. 2 illustrates that the highly reflective adhesive member 130 is used in the bonding process, the invention is not limited thereto. In an embodiment, instead of the highly reflective adhesive member 130, a highly reflective adhesive in a liquid form may be used, for example. In this case, after the process of disposing the light-transmitting signal transmission members 120a and 120b and the conductive signal transmission members 125a and 125b on the one surface of the highly reflective member 110, a highly reflective liquid adhesive may be applied. After the highly reflective liquid adhesive is applied, the non-conductive member 140 may be disposed. By pressing the non-conductive member 140 against the highly reflective member 110 with a predetermined pressure at a predetermined temperature after the non-conductive member 140 is disposed, the non-conductive member 140 may be attached to the highly reflective member 110. In an embodiment, the highly reflective liquid adhesive may be an adhesive that has flexibility after the pressing/attaching process, for example. In the pressing/attaching process, a process for removing bubbles in the highly reflective liquid adhesive (providing a predetermined vibration and/or vibration environment) may be added.

In an embodiment, the manufacturing method may include an operation of coupling the electrical shielding member 160 and the non-conductive member 140 on the second surface of the non-conductive member 140, which corresponds to the opposite surface to the first surface. Referring to reference numeral 401 of FIG. 3, after the process of attaching the highly reflective member 110 and the non-conductive member 140, a process of attaching the electrical shielding member 160 to the non-conductive member 140 may be performed. In an embodiment, the bonding process may include attaching the electrical shielding member 160 to the second surface of the non-conductive member 140 by the adhesive member 150, by applying a predetermined pressure to the electrical shielding member 160 at a predetermined temperature, for example. The bonding process may be referred to as a hot-press process.

As denoted by reference numeral 401, after the adhesive member 150 and the electrical shielding member 160 are attached, the adhesive member 150 may be attached to the second surface of the non-conductive member 140. In another embodiment, after the adhesive member 150 is attached to the second surface of the non-conductive member 140, the electrical shielding member 160 may be attached to the adhesive member 150.

Through the bonding process, as denoted by reference numeral 402, the electrical shielding member 160 may be attached to the non-conductive member 140 by the adhesive member 150. As described in relation to FIG. 2, instead of the adhesive member 150, a liquid adhesive may be used for bonding of the electrical shielding member 160.

Referring to FIG. 4, a process of forming the outer sheath part 170 of the flexible flat cable may be described.

In an embodiment, the outer sheath part 170 may be formed by pressing a first outer sheath part 170a and a second outer sheath part 170b. In an embodiment, referring to reference numeral 501, the first outer sheath part 170a and the second outer sheath part 170b may be pressed in a predetermined shape at a predetermined temperature, for example. In an embodiment, the first outer sheath part 170a and the second outer sheath part 170b may be pressed to face each other. Referring to reference numeral 502, according a pressing/attaching process, the outer sheath part 170 may be formed through physical and/or chemical coupling of the first outer sheath part 170a and the second outer sheath part 170b, for example. The embodiment of the process of forming the outer sheath part 170 is merely one of embodiments, and an arbitrary process for forming a sheath may be used for forming of the outer sheath part 170.

Figure 5:
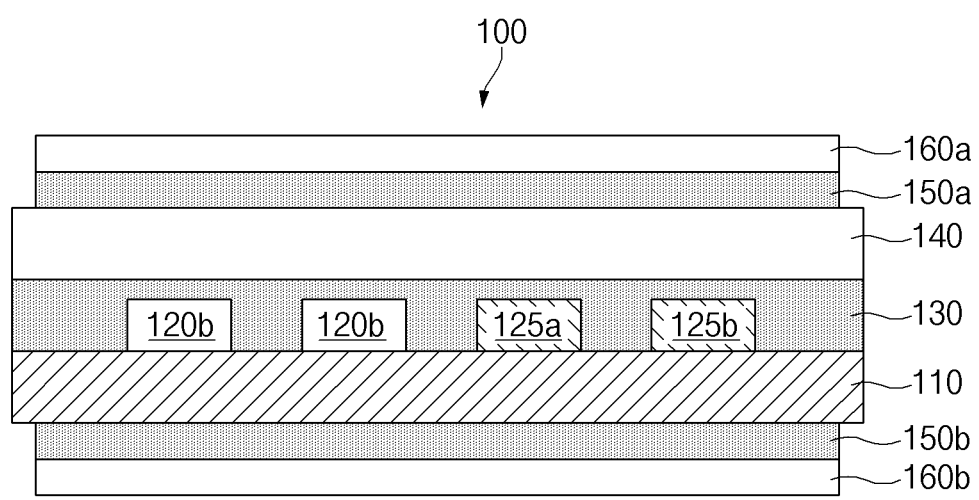
FIG. 5 illustrates an embodiment of a shielding structure of a flexible flat cable.

FIG. 5 illustrates a shield structure of the flexible flat cable 100.

Although it is illustrated in the embodiment of FIGS. 1A to 4 that the flexible flat cable 100 includes one electrical shielding member 160, the invention is not limited thereto. In an embodiment, the flexible flat cable 100 may further include an electrical shielding member attached to another surface of the highly reflective member 110.

Referring to FIG. 5, the flexible flat cable 100 may include a first electrical shielding member 160a (e.g., the electrical shielding member 160 of FIG. 1B) attached to the second surface of the non-conductive member 140 by a first adhesive member 150a. The flexible flat cable 100 may further include a second electrical shielding member 160b attached to the second surface of the highly reflective member 110 by a second adhesive member 150b. A description of the first electrical shielding member 160a and the second electrical shielding member 160b may be referenced by the description of the electrical shielding member 160 of FIG. 1B. A description of the first adhesive member 150a and the second adhesive member 150b may be referenced by the description of the adhesive member 150 of FIG. 1B.

Although not illustrated for convenience of description, the flexible flat cable 100 may further include the sheath part 170.

Figure 6:
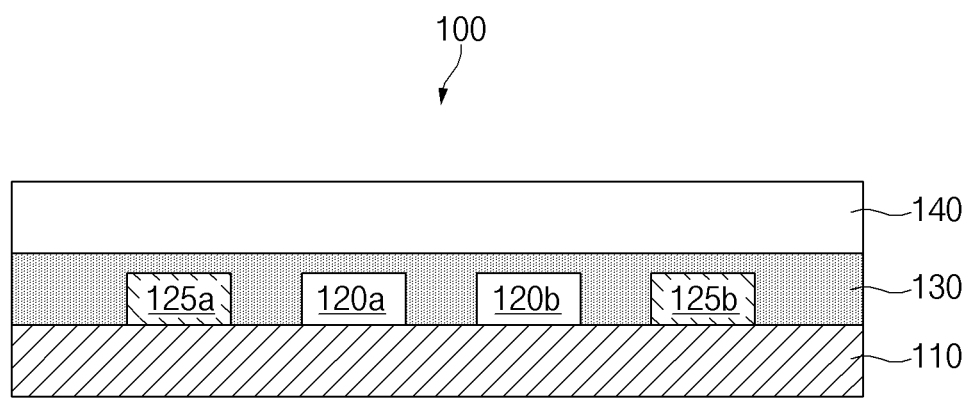
FIG. 6 illustrates an embodiment of signal lines disposed in a flexible flat cable.

FIG. 6 illustrates an embodiment of signal lines disposed in the flexible flat cable 100.

The embodiment of disposition of signal lines in the flexible flat cable 100 described above in relation to FIGS. 1A to 5 is merely one of embodiments, and the invention is not limited thereto. Although various components are omitted in FIG. 6 for convenience of description, it may be understood by an ordinary person in the art that the flexible flat cable 100 may further include a component, which is not illustrated in FIG. 6.

In an embodiment, the pair of conductive signal transmission members 125a and 125b among the signal lines on the highly reflective member 110 may be disposed on an outermost side. In an embodiment, as illustrated in FIG. 6, the conductive signal transmission member 125a may be disposed on a left outermost side on the first surface of the highly reflective member 110, and the conductive signal transmission member 125b may be disposed on a right outermost side on the first surface of the highly reflective member 110, for example. The light-transmitting signal transmission members 120a and 120b may be disposed between the conductive signal transmission member 125a and the conductive signal transmission member 125b, on the first surface of the highly reflective member 110.

In the embodiment of FIG. 6, lateral curving of the flexible flat cable 100 may be improved by disposing the conductive signal transmission members 125a and 125b having a relatively high flexibility on an outer side. Moreover, because an interval between the conductive signal transmission members 125*a* and 125*b* becomes larger, interferences between the conductive signal transmission member 125*a* and the conductive signal transmission member 125*b* may be reduced.

Figure 7:
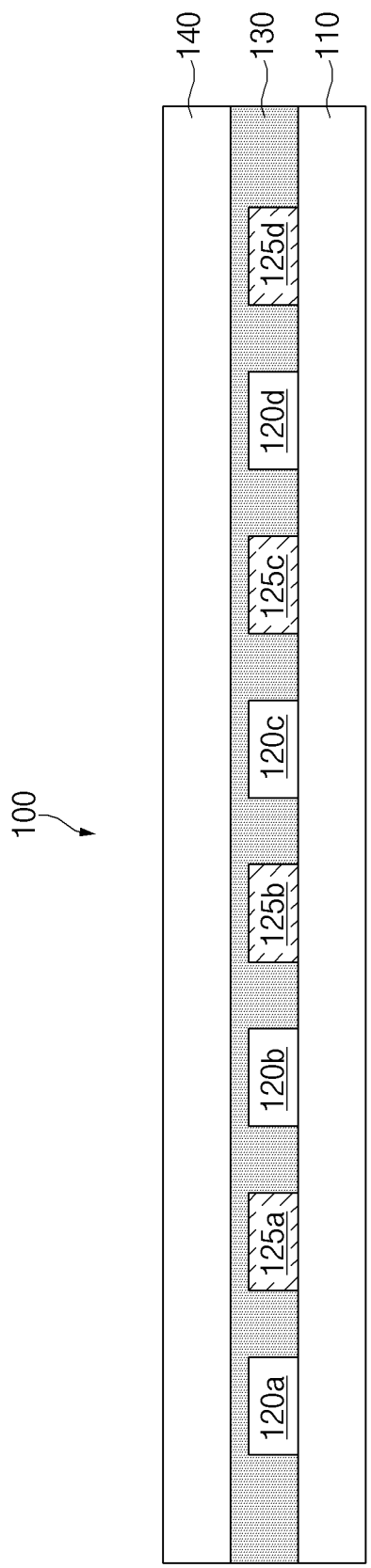
FIG. 7 illustrates an embodiment of signal lines disposed in a flexible flat cable.

FIG. 7 illustrates an embodiment of signal lines disposed the flexible flat cable.

The embodiment of disposition of signal lines in the flexible flat cable 100 described above in relation to FIGS. 1A to 6 is merely one of embodiments, and the invention is not limited thereto. In an embodiment, disposition of the signal lines in the flexible flat cable 100 and the number of the signal lines are not limited to FIGS. 1A to 6. Although various components are omitted in FIG. 7 for convenience of description, it may be understood by an ordinary person in the art that the flexible flat cable 100 may further include a component, which is not illustrated in FIG. 7.

In the embodiment of FIG. 7, the flexible flat cable 100 may include two pairs of light-transmitting signal transmission members 120*a*, 120*b*, 120*c*, and 120*d*, and two pairs of conductive signal transmission members 125*a*, 125*b*, 125*c*, and 125*d*. In an embodiment, the light-transmitting signal transmission members 120*a*, 120*b*, 120*c*, and 120*d*, and the conductive signal transmission members 125*a*, 125*b*, 125*c*, and 125*d* may be alternately disposed on the first surface of the highly reflective member 110. In this case, the intervals between the conductive signal transmission members 125*a*, 125*b*, 125*c*, and 125*d* may be increased. Accordingly, the interferences between the conductive signal transmission members 125*a*, 125*b*, 125*c*, and 125*d* may be reduced. Furthermore, the conductive signal transmission members 125*a*, 125*b*, 125*c*, and 125*d* may physically space the light-transmitting signal transmission members 120*a*, 120*b*, 120*c*, and 120*d* apart from each other. In an embodiment, before bonding is performed by the highly reflective adhesive member 130, the conductive signal transmission members 125*a*, 125*b*, 125*c*, and 125*d* may maintain physical spacing between the light-transmitting signal transmission members 120*a*, 120*b*, 120*c*, and 120*d*, for example.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A flexible flat cable comprising:
   a reflective member having characteristics close to a light reflectivity of 100% and having a plate shape;
   a pair of light-transmitting signal transmission members disposed on a first surface of the reflective member and spaced apart from each other;
   a pair of conductive signal transmission members disposed on the first surface of the reflective member and spaced apart from each other;
   a reflective adhesive member having characteristics close to a light reflectivity of 100%, fixing the pair of light-transmitting signal transmission members and the pair of conductive signal transmission members to the reflective member, and coupling the reflective member and a non-conductive member;
   the non-conductive member including a first surface contacting the reflective adhesive member, and a second surface opposite to the first surface of the non-conductive member;
   an adhesive member disposed on the second surface of the non-conductive member; and
   an electrical shielding member coupled to the non-conductive member through the adhesive member,
   wherein each of the light-transmitting signal transmission member is plate-shaped,
   wherein the reflective adhesive member surrounds each of the light-transmitting signal transmission members and the conductive signal transmission members other than bottom surfaces of the light-transmitting signal transmission members and the conductive signal transmission members, and
   wherein the bottom surfaces face the first surface of the reflective member.

2. The flexible flat cable of claim 1, wherein the reflective adhesive member surrounds circumferences of the pair of light-transmitting signal transmission members, together with the reflective member.

3. The flexible flat cable of claim 2, wherein the reflective adhesive member includes an optically clear adhesive.

4. The flexible flat cable of claim 1, wherein reflective member includes a polymer having flexibility.

5. The flexible flat cable of claim 1, wherein the electrical shielding member provides impedance matching for the pair of conductive signal transmission members.

6. The flexible flat cable of claim 1, further comprising:
   an additional adhesive member disposed on a second surface of the reflective member opposite to the first surface of the reflective member; and
   an additional electrical shielding member attached to the second surface of the reflective member through the additional adhesive member.

7. The flexible flat cable of claim 1, wherein the pair of light-transmitting signal transmission members is disposed on the first surface of the reflective member on a first side of the reflective member, and
   wherein the pair of conductive signal transmission members is disposed on the first surface of the reflective member on a second side of the reflective member opposite to the first side in a main plane extension direction of the reflective member.

8. The flexible flat cable of claim 1, wherein the pair of conductive signal transmission members includes a first conductive signal transmission member and a second conductive signal transmission member,
   wherein the first conductive signal transmission member is disposed on the first surface of the reflective member on a first side of the reflective member,
   wherein the second conductive signal transmission member is disposed on the first surface of the reflective member on a second side of the reflective member opposite to the first side in a main plane extension direction of the reflective member, and
   wherein the pair of light-transmitting signal transmission members is disposed on the first surface of the reflective member, between the first conductive signal transmission member and the second conductive signal transmission member.

9. The flexible flat cable of claim 1, wherein the pair of conductive signal transmission members includes a first conductive signal transmission member and a second conductive signal transmission member,
   wherein the pair of light-transmitting signal transmission members includes a first light-transmitting signal transmission member and a second light-transmitting signal transmission member,
   wherein the first light-transmitting signal transmission member is disposed on the first surface of the reflective member, between the first conductive signal transmission member and the second conductive signal transmission member, and wherein the first conductive signal transmission member is disposed on the first surface of the reflective member, between the first light-transmitting signal transmission member and the second light-transmitting signal transmission member.

10. The flexible flat cable of claim 1, further comprising:
a sheath part surrounds internal components of the flexible flat cable.

* * * * *